United States Patent
Verbeck et al.

(10) Patent No.: US 8,120,706 B1
(45) Date of Patent: Feb. 21, 2012

(54) VIDEO SYSTEM AND METHOD FOR AUTOMATIC SIZE AND POSITION ADJUSTMENT ACCORDING TO THE INCOMING STREAM

(75) Inventors: Anthony C. Verbeck, Tualatin, OR (US); Carl H. Alelyunas, Tualatin, OR (US)

(73) Assignee: Pixelworks, Inc., Portland, OR (US)

( * ) Notice: Subject to any disclaimer, the term of this patent is extended or adjusted under 35 U.S.C. 154(b) by 1288 days.

(21) Appl. No.: 11/761,989

(22) Filed: Jun. 12, 2007

Related U.S. Application Data

(60) Provisional application No. 60/804,536, filed on Jun. 12, 2006.

(51) Int. Cl.
*H04N 5/50* (2006.01)
(52) U.S. Cl. ..................... 348/556
(58) Field of Classification Search ............... None
See application file for complete search history.

(56) References Cited

U.S. PATENT DOCUMENTS

| | | | |
|---|---|---|---|
| 7,084,924 B2 * | 8/2006 | Topper et al. | 348/445 |
| 7,187,415 B2 * | 3/2007 | Arora | 348/445 |
| 7,339,627 B2 * | 3/2008 | Schoner et al. | 348/558 |

* cited by examiner

*Primary Examiner* — Paulos Natnael
(74) *Attorney, Agent, or Firm* — Marger Johnson & McCollom, P.C.

(57) ABSTRACT

We describe and claim a video system and method for automatic size and position adjustment according to the incoming stream. A detection module detects a size and a position of video including an aspect ratio of video on at least one channel of at least one video input source. An execution module adjusts a scale mode responsive to the detection of the size and position or aspect ratio of the video. Once the aspect ratio has been detected and the scale mode adjusted responsive to the detection, video is provided to the display of a display device. The detection and execution modules crop unintentional vertical blanking interval (VBI) lines from upconverted video signals. An on screen display includes a selection for active management that provides for automatic detection of size and position information, or a manual control mode for selection by the user.

24 Claims, 7 Drawing Sheets

VIDEO SYSTEM AND METHOD FOR AUTOMATIC SIZE AND POSITION ADJUSTMENT ACCORDING TO THE INCOMING STREAM

RELATED APPLICATION

This application claims priority from U.S. provisional patent application Ser. No. 60/804,536, filed Jun. 12, 2006, titled Video System And Method For Automatic Size And Position Adjustment According To The Incoming Stream. We incorporate by reference this application in its entirety.

FIELD

This application relates to video systems and methods and, more particularly, to a video system and method for automatic size and position adjustment according to the incoming stream.

BACKGROUND

Over six decades ago, an analog television standard named after the governing body that developed it—the National Television System(s) Committee (NTSC)—became the standard for television signal transmission in the United States. The NTSC standard was later adopted by other countries including Japan and most of North and South America. The NTSC standard is sometimes criticized for its poor color balance and low quality image. Nonetheless, NTSC has flourished and is still in use today. Many attribute the success and ubiquity of NTSC to its wide-ranging compatibility with television and broadcast devices and its forward and backward compatibility among the various versions of the NTSC standard itself. However, it soon became apparent that a new standard was needed to replace the NTSC standard and to incorporate emerging digital technologies. Established in 1982, the Advanced Television System(s) Committee (ATSC) developed a digital television standard. The digital television standard was named after the governing body—ATSC. The ATSC standard supports a 16:9 ratio, up to 1920 pixels wide, and up to 1080 lines of resolution—more than six times the display resolution of the NTSC (analog) standard. The ATSC standard is intended to replace the NTSC standard.

Notwithstanding the enhanced image quality provided by the ATSC standard, a large portion of the general population continue to own and use television sets that lack support for the new ATSC standard. This presents a dilemma to broadcast stations. Replacing an entire broadcast station's infrastructure with equipment capable of supporting the ATSC standard is costly. Such an approach may offer a low return on investment considering that much of the population have no way of watching ATSC signals on their television sets. Alternatively, broadcast stations may opt to maintain video content in NTSC form, and up-convert the NTSC material into an ATSC signal as a final step in the transmission of the signal. This allows an incremental investment or partial replacement of the infrastructure because less equipment is required. This approach also allows broadcast stations to continue to provide NTSC signals to those customers who may still demand it. Thus, many broadcast stations use up-converters as part of their infrastructure to enable transmission of legacy standard NTSC material to ATSC signals.

Some broadcasters do not correctly handle the up-conversion of NTSC material to ATSC signals. The NSTC standard includes a provision for a vertical blanking interval (VBI). The vertical blanking interval is the time period required for a scanning electron beam to return from the last line of a given video field, to the first line of a next video field. During this time period, 22 horizontal lines known as VBI lines are displayed to the screen. To avoid adverse effects to the image quality of an NTSC video display, VBI lines are purposely weak and detectable only by circuitry designed to decode information stored in the VBI lines such as close caption (CC) and v-chip data. ATSC digital television signals should not include VBI lines. An up-conversion of an NTSC signal which contains VBI lines to an ATSC signal should crop the VBI lines to avoid annoying flashing in the ATSC signal. In some cases, broadcasters properly up-convert the signals resulting in the transmitted image consisting only of the active video. In other cases, broadcasters improperly up-convert the signals resulting in one or two lines of the VBI being shown in the display area creating an annoying flashing as the close caption (CC)/v-chip data is broadcast. In the most extreme case, no VBI cropping occurs, which results in all of the lines of VBI being displayed together with the active video.

There are also numerous channels that have shows of various aspect ratios. It would be advantageous to have an improved video system and method for automatic aspect ration (size and position) adjustment according to the incoming stream. Televisions and other display devices lack the ability to detect the size and position of incoming video and adjust the scale mode to match. Users of these types of display devices are often un-savvy with technology in general, and particularly with often complex and sometimes confusing television aspect ratios, formats, and scale modes. Typically, a user would prefer that the TV or system handle the complexity on their behalf in an automated fashion. Other types of users may prefer the latitude of manually refining the characteristics of the display device by specifically choosing a particular display mode. Even the more sophisticated users, however, prefer to have an intuitive on screen display (OSD)—one with clear options that are easily understood and properly labeled. Display devices may have multiple media input sources. This may further complicate the configuration of the scale mode and other characteristics of a particular input source or channel.

Accordingly, a need remains for a video system to properly output video data to a display device. And a need remains for a video system with an automatic detection feature that automatically detects the size and position of an input stream and adjusts the scale mode to match. There also is a need for an intuitive on screen display (OSD).

DETAILED DESCRIPTION OF THE PREFERRED EMBODIMENTS

We describe different embodiments of an inventive video system and method for automatic size and position adjustment according to an incoming stream by referencing the accompanying drawings. A person of reasonable skill in the art should recognize that many changes may be made to the many embodiments of the inventive video system and method we describe without departing from the spirit and scope of the claims that follow the description. The description should not be taken in a limiting sense.

Figure 1:
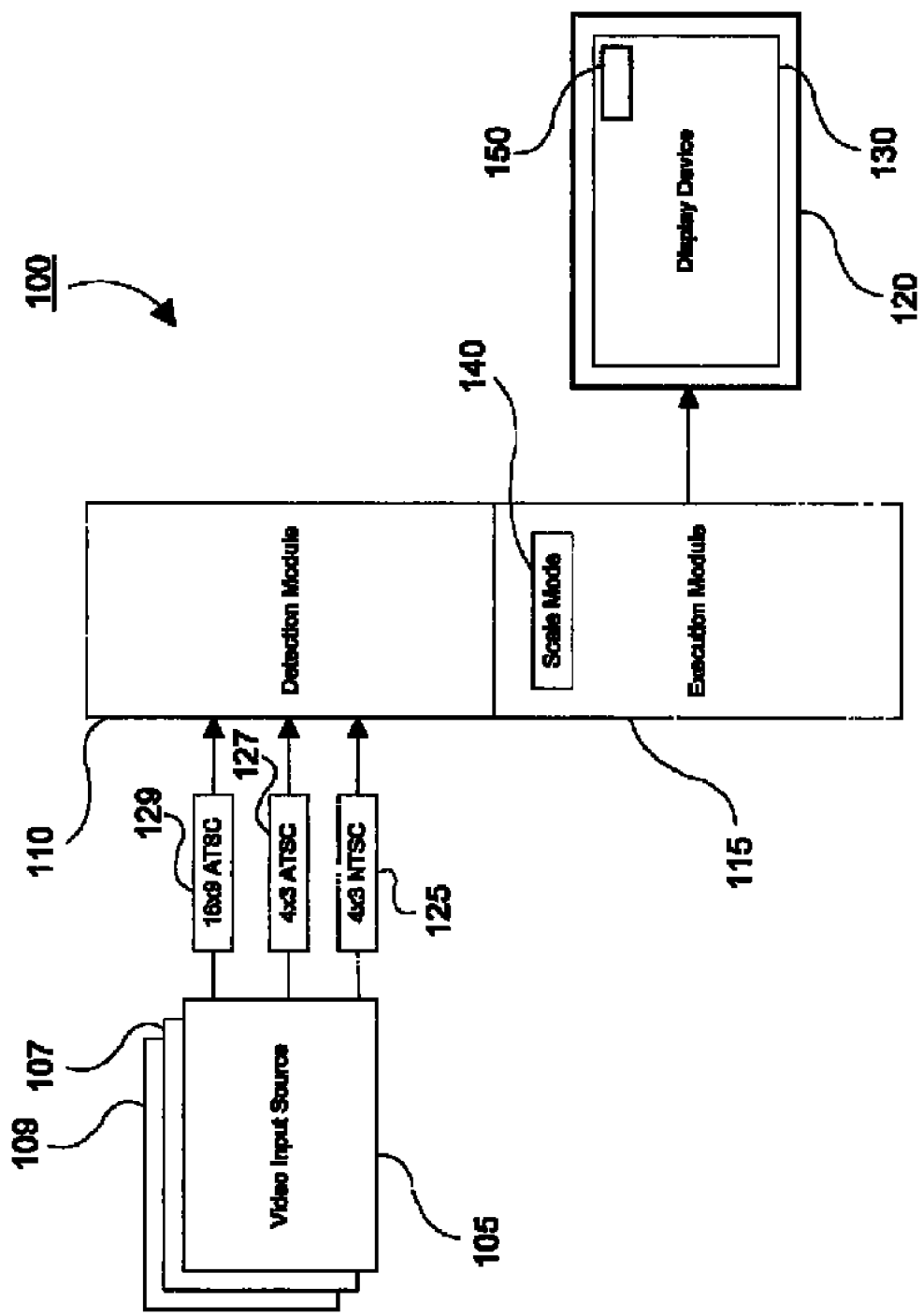
FIG. 1 shows embodiments of the detection and execution modules with corresponding video channels, input sources, and a display device.

FIG. 1 is a block diagram of a video system 100 including a detection module 110 which detects an aspect ratio of video on at least one channel (e.g., 125, 127, or 129) of at least one video input source (e.g., 105, 107, and 109). An execution module 115 adjusts a scale mode 140 responsive to the detection of the aspect ratio. Once the detection module 110 detects the aspect ratio and adjusts the scale mode responsive to the detection, it provides video to the display 130 of a display device 120. The display device 120 may be a television, a portable or handheld device, a projector with an associated wall or screen, or any other display device capable of displaying video. The execution module 115 optionally provides status information or a status message 150 to the display device 120. The status information or message 150 may indicate the current aspect ratio and scale mode, but may also indicate other pertinent information. Although FIG. 1 shows the status information or status message 150 in the upper right corner of the display 130 of the display device 120, a person having ordinary skill in the art can appreciate that the status information or status message 150 could be displayed in any visible location of the display 130 or the display device 120.

The detection module 110 and the execution module 115 may be implemented in either hardware or software. The detection module 110 detects video from at least one video input source, e.g., sources 105, 107, and 109. A video input source may include a DVD player, a broadcast television signal, a video tape player, a set-top box, a cable signal, a computer, an internet edge device, or any other device or method capable of delivering a video signal that is known to a person having ordinary skill in the art. The execution module 115 receives information from the detection module 110. The detection and execution modules 115 and 110, respectively, may be incorporated into an image processor like those manufactured by the assignee of the present application. Alternatively, the detection and execution modules may be separate devices, such as an Application Specific Integrated Circuit (ASIC) or a programmable logic device (PLD). Each may also be implemented as a software module, firmware, library, or application.

Figure 2:
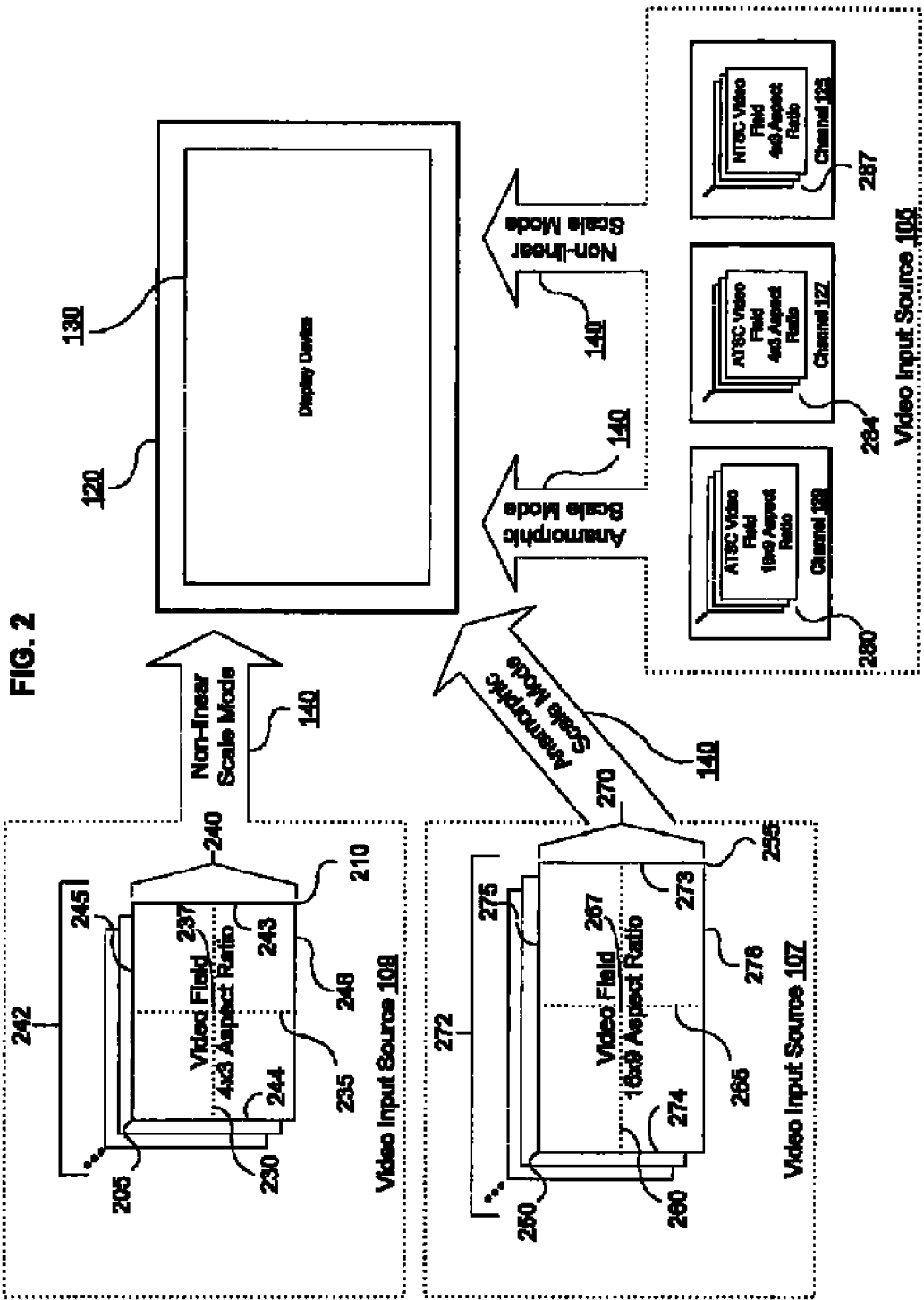
FIG. 2 shows the video channels and input sources of FIG. 1, the display device of FIG. 1, a detection of the aspect ratio, and a selection of the scale mode.

FIG. 2 illustrates an example embodiment, including a more detailed view of video input sources 105, 107, and 109 from FIG. 1. Scale mode 140—either non-linear or anamorphic—is selected according to the aspect ratio (size and position) of the video signal received from the video input sources. For example, if the detection module 110 detects video with an aspect ratio of 1.33:1, otherwise known as 4×3 (e.g., 242), then the execution module automatically scales the video consistent with a non-linear scale mode. This is particularly applicable to video with an aspect ratio of 4×3 (e.g., 242) that is intended to cover the entire display 130 of the display device 120. The non-linear scale mode may also be thought of or labeled as a "standard" or "TV" mode. Additionally, if the detection module 110 detects video with an aspect ratio of 1.78:1, otherwise known as 16×9 (e.g., 272), then the execution module automatically scales the video consistent with an anamorphic or linear scale mode. This is particularly applicable to video with an aspect ratio of 16×9 (e.g., 272) that is intended to cover the entire display 130 of the display device 120. The anamorphic or linear scale mode may also be thought of or labeled as a "cinema" or "DVD" mode. As shown in FIG. 2, a video input source 105 may carry multiple channels 129, 127, and 125. Each of the channels may carry a video signal containing video fields with corresponding aspect ratios, respectively, 280, 284, and 287. The video signals may be either NTSC or ATSC signals; the NTSC signals may have a 4×3 aspect ratio (e.g., 287) and the ATSC signal may have either 4×3 (e.g., 284) or 16×9 (e.g., 280) aspect ratios. The scale mode 140 is automatically selected by the execution module 115 according to the aspect ratio (e.g., 125, 127, 129) detected by the detection module 110 for a given channel (e.g., 125, 127, 129) and video input source (e.g., 105, 107, 109). Automated detection and scaling allows for user-friendly operation of the display device such that active video may be properly displayed. Active video, as defined here, includes visual images of stationary or moving objects.

In a hardware embodiment, the detection module 110 determines exact start and end coordinates (upper left, e.g., 205 and 250, and lower right corner, e.g., 210 and 255) for each video field of the active video (e.g., 242, 272). Active video may refer to the video signal exclusive of the VBI. The start and end coordinates may be calculated for each video field (e.g., 240, 270), or may be calculated for each of a plurality of video fields (e.g., 242, 272).

Figure 3:
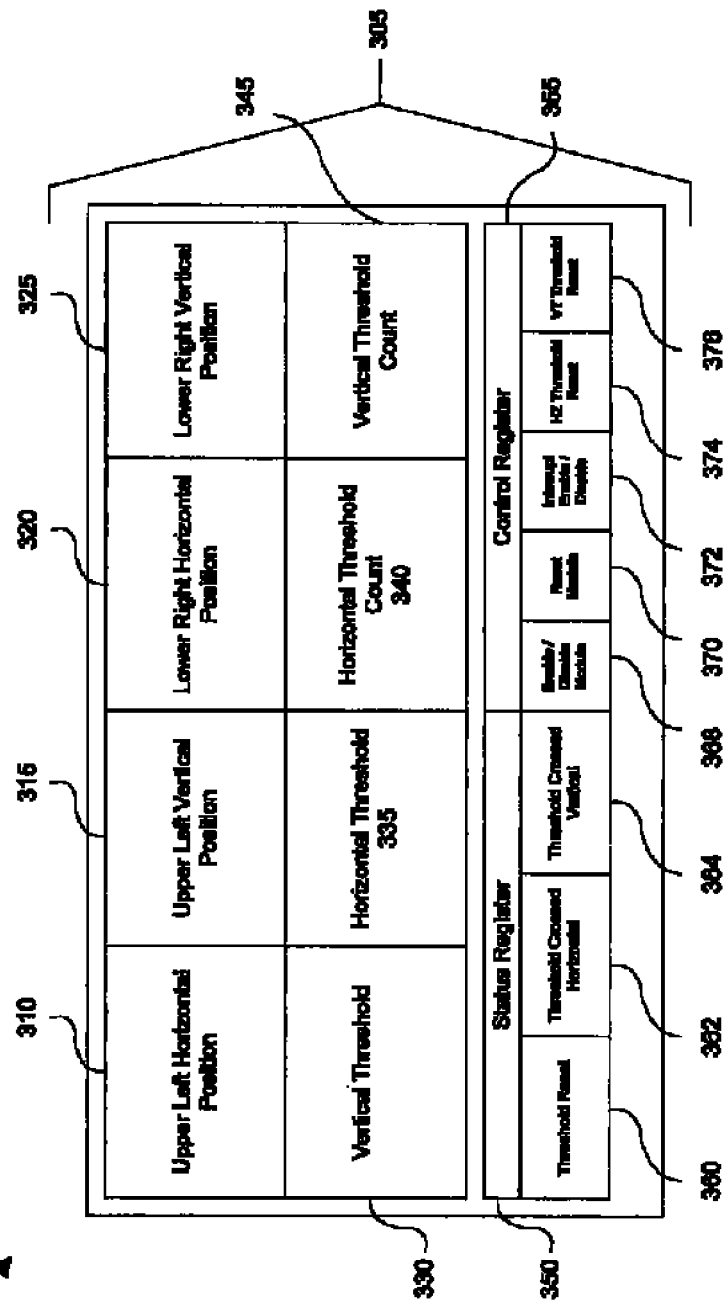
FIG. 3 shows an embodiment of the detection module of FIG. 1 including registers and register values.

FIG. 3 shows several registers in a hardware embodiment of the detection module. When programmable thresholds 335 and 330 are passed, an interrupt is generated to indicate that the active video area has changed. The interrupt may be a hardware interrupt to indicate to firmware a change in the active video area. The detection module 110 may also distinguish between video content with a 4×3 aspect ratio (e.g., 125, 127) and video content with a 16×9 aspect ratio (e.g., 129). The detection module performs a horizontal line (e.g., 230, 260) and a vertical line (e.g., 235, 265) delta test including a search that goes directly through the center of the image (e.g., 237, 267) as described by the video input sources 105, 107, and 109. The horizontal line and vertical line delta test determines the spatial characteristics of the video signal such as start and end coordinates (e.g., 205, 210, 250, and 255).

Referring to FIG. 2 and FIG. 3, several registers 305 are provided to enable the operation of the detection module 110. Four of the registers (310, 315, 320, 325) may be, e.g., 16 bit read only registers that are used to track positional information of a current video field (e.g., 240, 270). First, an Upper Left Horizontal Position (PDET_ULH_POS) register 310 contains the upper left horizontal position for the current video field. Second, an Upper Left Vertical Position (PDET_ULV_POS) register 315 contains the upper left vertical position for the current video field. Third, a Lower Right Horizontal Position (PDET_LRH_POS) register 320 contains the lower right horizontal position for the current video field. Finally, a Lower Right Vertical Position (PDET_LRV_POS) register 325 contains the lower right vertical position for the current video field. The registers 310, 315, 320, and 325 may be periodically updated including during each vertical blanking period.

In addition to the four positional registers discussed above, the plurality of registers 305 includes two threshold registers 330 and 335. The threshold registers 330 and 335 may be 16 bit read/write registers. One of these registers is a Vertical Threshold (PDET_VT_THRESH) register 330. If the vertical position of either the left column (e.g., 244, 274) or right column (e.g., 243, 273) of the active video (e.g., 242, 272) changes by a delta exceeding the Vertical Threshold 330, the following events may occur: (1) the Threshold Crossed Vertical status 364 of the Status Register 350 is set, (2) the Vertical Threshold Count register 345 is incremented, and (3) an interrupt PDET_THRESH_INT (not shown) is signaled. Similarly, another of these registers is a Horizontal Threshold (PDET_HZ_THRESH) register 335. If the horizontal position of either the top line (e.g., 245, 275) or the bottom line (e.g., 248, 278) changes by a delta exceeding the Horizontal Threshold 335, the following events may occur: (1) the Threshold Crossed Horizontal status 362 of the Status Register 350 is set, (2) the Horizontal Threshold Count register 340 is incremented, and (3) the interrupt PDET_THRESH_INT (not shown) is signaled. The Vertical Threshold Count register 345 and the Horizontal Threshold Count register 340 are read only registers and may be reset using the VT Threshold Reset bit 376 and the HZ Threshold Reset bit 374, respectively. The Threshold Reset status 360 of the Status Register 350 indicates whether one of the threshold count registers was reset. The Interrupt Enable/Disable bit 372 of the Control Register 355 controls the PDET_THRESH_INT interrupt (not shown). The Reset Module bit 370 and the Enable/Disable Module bit 368 of the Control Register 355 control the state of the detection module 110.

Figure 4:
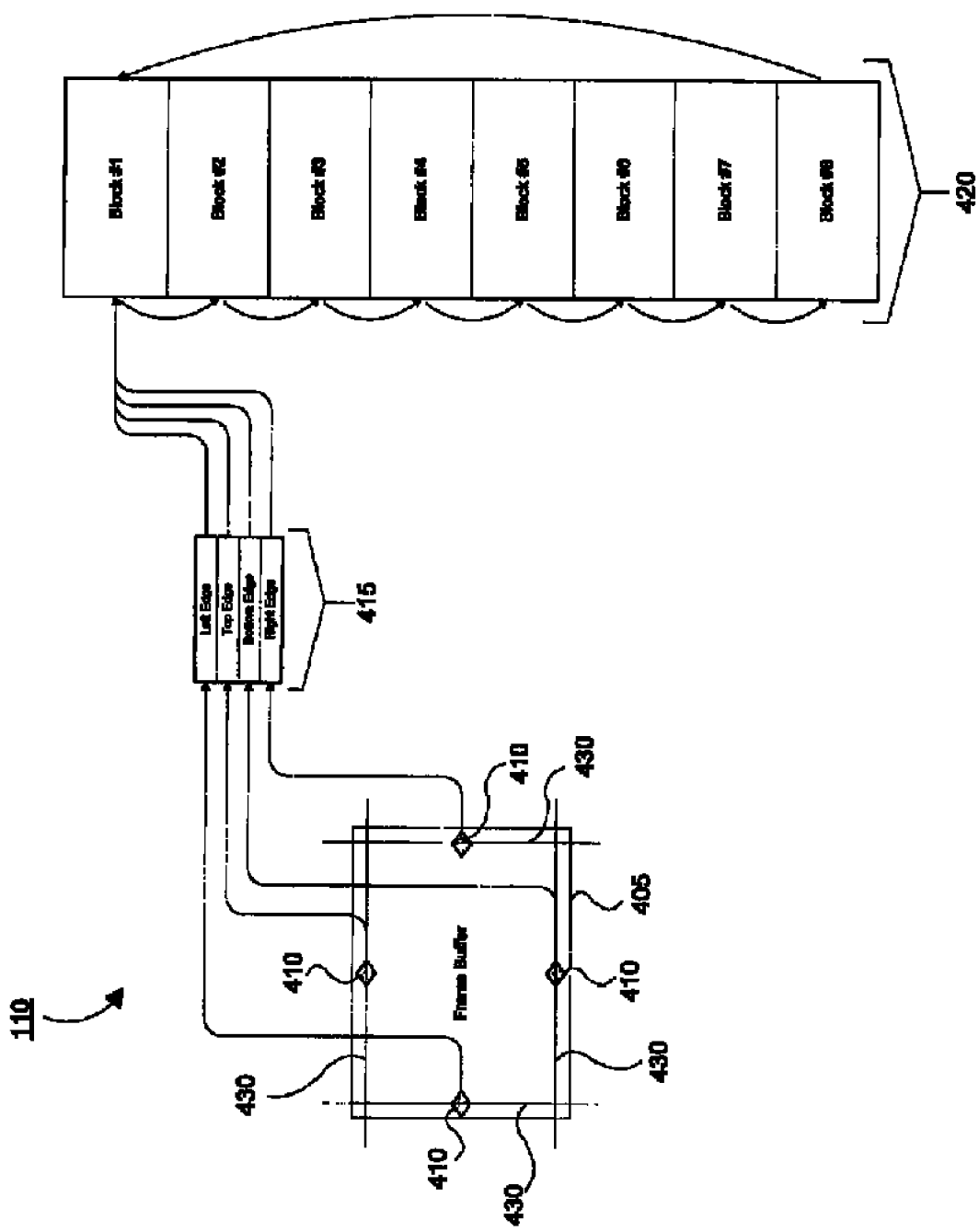
FIG. 4 shows an embodiment of the detection module of FIG. 1 including black spots, corresponding Boolean values, and corresponding blocks of Boolean values.

FIG. 4 shows an embodiment of the detection module 110. A software detection module 110 may be implemented on currently available television image processors, such as those available from the present application's assignee. The software detection module may also be implemented using other general purpose or specialized processors or computing systems, as understood by those having ordinary skill in the art. A size and a position of video may be detected by sampling various points in a video frame buffer 405 for potential "black spots" (e.g., 410). Each set of four "black spots" 410 corresponds with or represents outside edges 430 of the active video relating to one of several possible "black bar" modes (e.g., 405, 905). A "black bar" mode, as defined here, is a mode where the display area includes an inactive area on at least one of its left, right, top, or bottom edges. The "black bars" do not necessarily have to be black. Four Boolean values 415 correspond with or indicate the four "black spots" and represent a Left Edge, Top Edge, Bottom Edge, and Right Edge (e.g., 430). The Boolean values 415 are stored in sets of four otherwise known as Blocks (e.g., 420).

The information stored in a given Block describes a size and a position of the active video and helps the execution module 115 determine which scale mode should be applied. Preferably, up to 8 points—two blocks, each block containing four Boolean values—may be collected during each vertical interrupt. The procedure of collecting Block information may continue for a total of four vertical interrupts during which 32 points are sampled, and 8 blocks (e.g., 415, 420) are filled with Boolean values. Once all 8 blocks have been filled, the process may begin again. In one embodiment, the detection module 110 may be configured to fill at least one of the plurality of blocks with the Boolean values within a processing of a vertical interrupt. In another embodiment, the detection module 110 may be configured to fill at least one of the plurality of blocks with the Boolean values within a processing of each of a plurality of vertical interrupts.

Each block may be used to detect the aspect ratio of the video and may also correspond with a potential scale mode. As can be appreciated by persons having ordinary skill in the art, more than 8 points may be sampled during a vertical interrupt as long as the load on the vertical interrupt routine is kept in check. Similarly, fewer than 8 points may be sampled during a vertical interrupt if so desired. The positional data, and yes/no for whether the point is "black" or not, is used to drive a state machine of the execution module 115.

Figure 5:
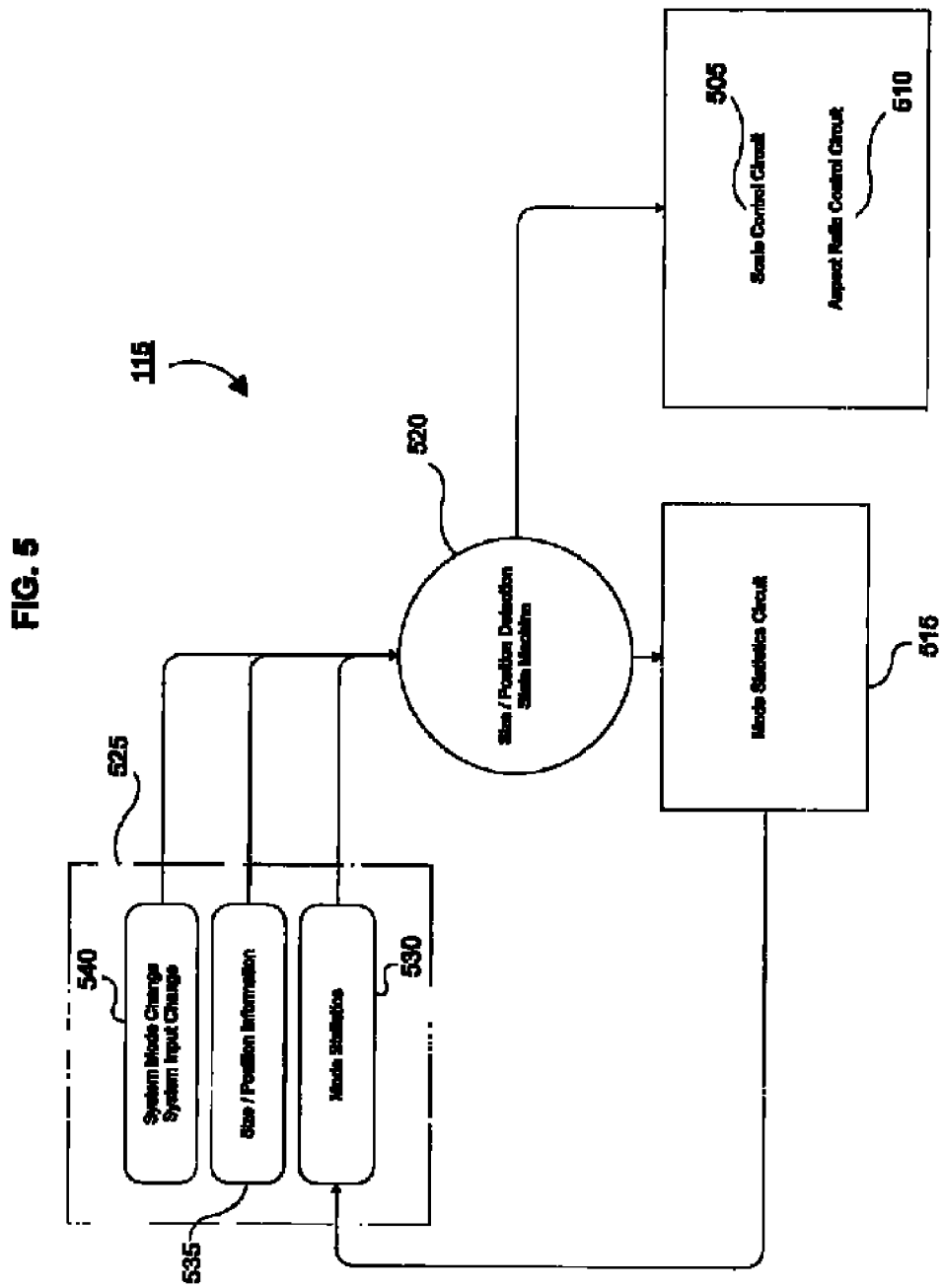
FIG. 5 shows an embodiment of the execution module of FIG. 1.

FIG. 5 shows an example embodiment of the execution module 115 which receives certain input information 525. Size and position information 535 includes the information gathered (e.g., 415, 420) during the vertical interrupt processing and is fed into the size/position detection state machine 520. System mode change and system input change information 540 is also fed into the state machine 520. The state machine 520 controls a mode statistics circuit 515, a scale control circuit 505, and an aspect ratio control circuit 510. The mode statistics circuit 515 compiles and stores mode information such as current scale mode and the duration that the scale mode is used. The duration is preferably stored as a number of seconds. The mode statistics circuit 515 then feeds mode information 530 back to the size/position detection state machine 520 allowing the state machine to refine how the next scale mode is selected. According to this aspect of the invention, the state machine controls the scale control circuit and the aspect ratio control circuit according to mode statistics.

Figure 6:
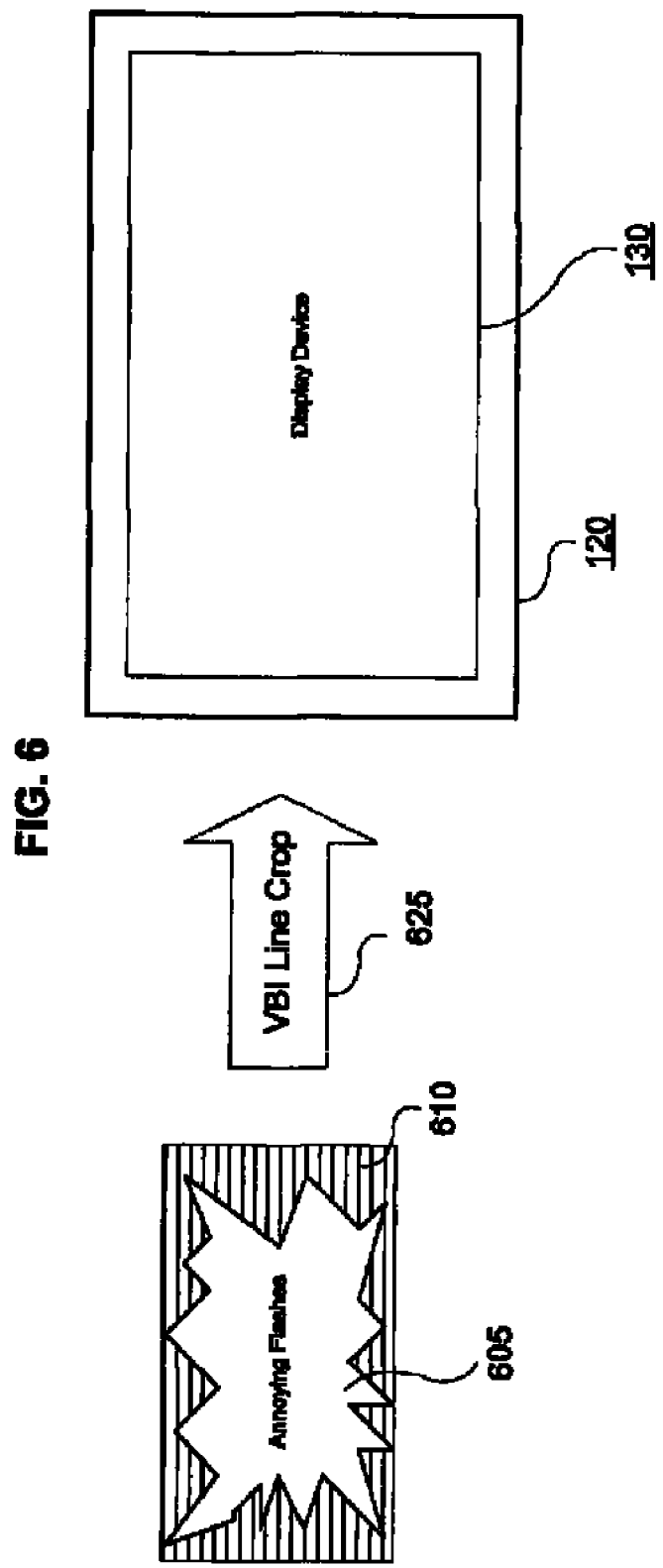
FIG. 6 shows the cropping of vertical blanking interval (VBI) lines.

FIG. 6 shows an example embodiment of a function performed by the detection 110 and execution 115 modules. The function is to crop vertical blanking interval (VBI) line data 610 from the video. The detection module detects at least one vertical blanking interval (VBI) line 610, and the execution module generates cropped video by cropping 625 at least one VBI line 610 from the video. The execution module then provides cropped video to the display 130 of a display device 120. The cropped video may cover the entire display 130 of the display device 120. Cropping the vertical blanking interval (VBI) lines 610 from the video has the effect of removing annoying flashes 605 that can occur when close caption (CC)/v-chip data is unintentionally broadcast as a result of an improper upconversion of video from NTSC to ATSC.

Figure 7:
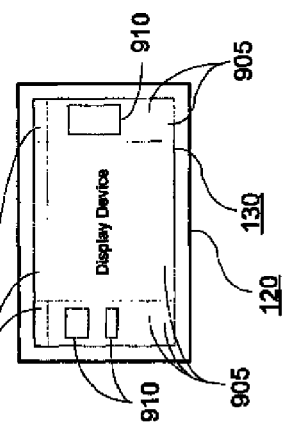
FIG. 7 shows an embodiment of an on screen display (OSD).

FIG. 7 shows an example embodiment 710 of an on screen display (OSD). The OSD includes a selection for active management 715, or in other words, an automatic detection mode. When active management 715 is "On," the detection module 110 and execution module 115 described above automatically engage to detect the aspect ratio (e.g., 125, 127, and 129) and apply a corresponding scale mode 140. The active management mode may also engage the Vertical Blanking Interval (VBI) line 610 removal feature discussed above. This ensures that annoying flashes 605 are not displayed to the display 130 of the display device 120. Status information or status message 150 may optionally be displayed indicating such items as the current aspect ratio and scale mode. When active management 715 is "Off," the information coming from the detection module 110 is ignored and the video is displayed without modification and without automatic scaling. This can also be considered a manual control mode.

Still referring to FIG. 7, even when the active management 715 is "On," a user may still desire to fine-tune how the video covers the display 130 of the display device 120. The Aspect Ratio selection 720 allows for this determination. When set to "Wide," the active video is automatically scaled to cover 100% of the display 130 irrespective of the aspect ratio. When set to "Native," one of several results are possible: (1) if the video signal has an aspect ratio of 1.78:1 (16×9), and the display device is a true 16×9 display device (1366×768 or 1280×720), then the active video is scaled to cover 100% of the display 130 and there are no "black" bars; (2) if the video signal has an aspect ratio of 1.33:1 (4×3) and active management is "On," then the active video is scaled to cover 100% of the display 130 and there are no "black" bars; (3) if the video signal has an aspect ratio of 1.33:1 (4×3) and active management is "Off," then "black" bars are automatically placed on the left and right areas of the display 130; (4) if the video signal has an aspect ratio of 1.78:1 (16×9), and the display is something other than a true 16×9 display (e.g., a 15×9 display), then "black" bars are automatically placed on the top and bottom areas of the display 130; (5) if the video signal has an aspect ratio above 1.78:1 (16×9), then "black" bars are automatically placed on the top and bottom areas of the display 130; (6) if the video signal has an aspect ratio somewhere between 1.33:1 (4×3) and 1.78:1 (16×9), then "black" bars are automatically placed on the left and right areas of the display 130.

The on screen display (OSD) of FIG. 7 also includes a manual selection for widescreen scale mode 725. This manual selection may only be available when the active management 715 is "Off." The widescreen scale mode 725 selection includes two possible settings: (1) DVD/anamorphic/cinema, and (2) TV/non-linear/standard. The DVD/anamorphic/cinema mode scales the video in a linear fashion. This is particularly useful for video with an aspect ratio of 16×9 that is intended to cover the entire display 130. The TV/non-linear/standard mode scales the video in a non-linear fashion. This is particularly useful for video with an aspect ratio of 4×3 that is intended to cover the entire display 130. Users are at a disadvantage if they are required to manually select the widescreen scale mode 725. Preferably, a user will enable the active management 715 to an "On" state to engage the detection module 110 and execution module 115 to reduce the complexity involved with selecting the proper aspect ratio and scale mode.

The blank area color selection 730 allows the user to select the color of the inactive areas of the display 130. These inactive areas are also known as "black" bars. The user may select the color of the inactive areas using this selection. Possible colors may include: Black, Gray #1 (20 IRE gray), and Gray #2 (40 IRE gray).

The smooth scaling selection 735 allows the user to select whether a scaling transition will occur smoothly over a period of time ("On") or whether scaling transitions are instant ("Off"). The smooth scaling transition may be more visually pleasing to the user. Preferably, the transition occurs over a period of approximately 2 seconds. It can be appreciated by those with skill in the art, however, that this transition may occur over a period of time more or less than 2 seconds. In one embodiment, the execution module is configured to adjust the scale mode as a scaling transition. In another embodiment, the execution module is configured to adjust the scale mode as a smooth scaling transition. The status display selection 740 allows the user to select whether the status information or status message—including current aspect ratio and scale mode—is visually displayed on either the display 130 or the display device 120.

The menu selections illustrated in FIG. 7 may be presented and saved per video input source. For example, a user may desire that a video input source, such as a DVD player attached to an s-video input, be set to Active Management "Off" and a fixed 16×9 anamorphic scale mode. On the other hand, the user may desire that a second video input source, such as an NTSC signal, be set to a different mode such as Active Management "On" which would automatically scale the active video to cover the entire display. In one embodiment, the menu selections are stored for each of a plurality of video input sources. In another embodiment, the scale mode is stored for each of a plurality of video input sources.

Figure 8:
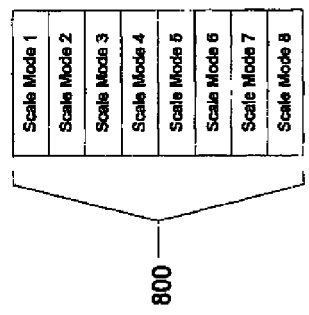
FIG. 8 shows an embodiment of a table containing frequently used scale modes.

FIG. 8. shows a table containing frequently used scale modes 800. The detection module 110 or execution module 115 may be used to determine the scale mode 140 of each channel (e.g., 125, 127, and 129) of a video input source (e.g., 105). The scale mode 140 may be stored on a channel-by-channel basis. In one embodiment, the scale mode is stored for each of a plurality of channels. In another embodiment, a table is used to store a plurality of frequently used scale modes. The table may also store related information such as the duration that each of the scale modes is used. If a particular scale mode is used more often than other scale modes, the detection module 110 or execution module 115 may select it more quickly. If a particular scale mode is used less often than other scale modes, the detection module 110 or execution module 115 may select it quite slowly. In other words, the detection module or execution module may learn which scale modes are used more often than others. In one embodiment, the detection module 110 or execution module 115 may include hysteresis to prevent jumps of the scale mode. Table 800 may store several scale modes, e.g., between four and eight frequently used scale modes. A person having ordinary skill in the art should recognize that this table may store more or less than the preferred number of table entries.

Figure 9:
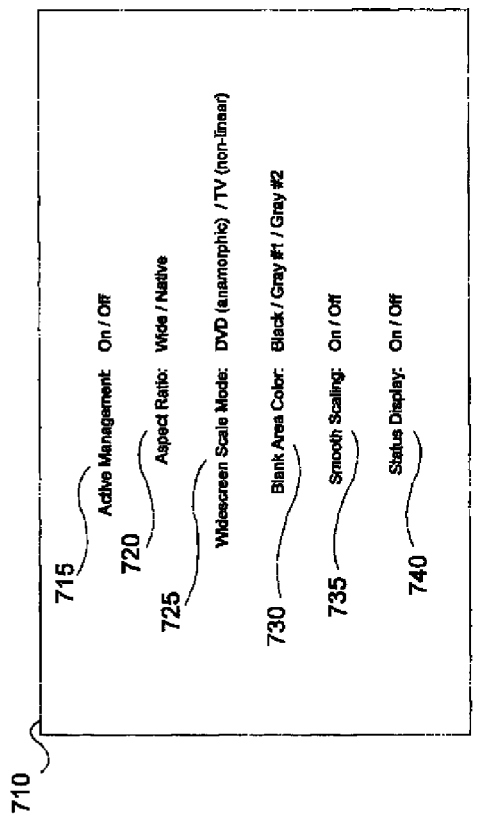
FIG. 9 shows an embodiment of a display device with objects displayed in inactive areas of the display.

FIG. 9 shows an example embodiment including a display device 120 with at least one object 910 displayed in inactive areas 905 of the display 130. It is possible to take advantage of the inactive area on either side of a display 130, such as when a device is capable of showing 16×9 HDTV (ATSC) video, but is displaying a 4×3 SDTV (NTSC) video signal. The display device may generate objects and display them in the "black bar" regions 905. These inactive areas are also sometimes referred to as letter-box or pillar-box regions 905. The objects 910 can be either locally or remotely generated. Examples of locally generated objects may include the time, EPG data (channel number and program name), input information (the source, aspect ratio, and audio modes). Examples of remotely generated objects include things like widgets. This aspect of the invention is described in more depth in U.S. provisional patent application Ser. No. 60/803,843, filed Jun. 2, 2006, titled Interactive Television System And Method For Providing Dynamic And Independent Web Connectivity, which we incorporate here by reference.

We have illustrated and described the principles of a video system and method for automatic size and position adjustment according to the incoming stream by way of illustrative and not restrictive examples. Those of skill in the art will recognize certain modifications, permutations, additions, and sub-combinations to the exemplary embodiments we describe above. We intend that those claims we introduce later be interpreted to include all such modifications, permutations, additions, sub-combinations as are within the spirit and scope.

We claim:
1. An apparatus comprising:
 a detection module to detect an aspect ratio of video on at least one channel of at least one video input source and to detect at least one vertical blanking interval line in the video, the detection module configured to detect the aspect ratio start coordinates in an upper left corner and an end coordinate in a lower right corner within a video field according to a horizontal line and vertical line delta test; and an execution module to adjust a scale mode responsive to the detection by cropping the at least one VBI line from the video.

2. The apparatus of claim 1 where the detection module is configured to detect the aspect ratio each of a plurality of video fields.

3. The apparatus of claim 1 where the detection module is configured to distinguish 4×3 video from 16×9 video.

4. The apparatus of claim 3 where the coordinates are determined according to a horizontal line and a vertical line delta test.

5. The apparatus of claim 4 where the coordinates are stored in a plurality of registers and updated during a vertical blanking period.

6. The apparatus of claim 5 comprising a plurality of registers to store horizontal and vertical positions.

7. The apparatus of claim 6 comprising a plurality of registers to store horizontal and vertical position thresholds, where the detection module is configured to update a status according to a change in an active video area exceeding at least one of the thresholds.

8. The apparatus of claim 7 comprising a plurality of registers to store horizontal and vertical threshold counts, where the detection module is configured to increment at least one of the counts when the change in the active video area exceeds the at least one of the thresholds.

9. The apparatus of claim 8 where the detection module includes hysteresis to prevent jumps of the scale mode.

10. The apparatus of claim 1 where the execution module is configured to provide a status message to a display device to indicate the aspect ratio and the scale mode.

11. The apparatus of claim 1 where the execution module is configured to provide the cropped video to a display device.

12. The apparatus of claim 11 where the cropped video covers an entire display of the display device.

13. The apparatus of claim 1 where the detection module detects a size and a position according to a plurality of black spots in a frame buffer representing outside edges of the video corresponding with one of a plurality of black bar modes.

14. The apparatus of claim 13 where the detection module includes a plurality of blocks, each block including four Boolean values, each Boolean value indicating one of the plurality of black spots in the frame buffer.

15. The apparatus of claim 14 where the plurality of black spots detected in the frame buffer are used to detect the aspect ratio of the video.

16. The apparatus of claim 14 where the plurality of blocks are eight or fewer.

17. The apparatus of claim 14 where the detection module is configured to fill at least one of the plurality of blocks with the Boolean values within a processing of a vertical interrupt.

18. The apparatus of claim 17 where the detection module is configured to fill at least one of the plurality of blocks with the Boolean values within a processing of each of a plurality of vertical interrupts.

19. The apparatus of claim 1 where the scale mode includes anamorphic and non-linear modes.

20. The apparatus of claim 1 where the execution module includes a state machine to control a scale control circuit.

21. The apparatus of claim 20 where the state machine controls an aspect ratio control circuit.

22. The apparatus of claim 21 where the state machine controls the scale control circuit and the aspect ratio control circuit according to mode statistics.

23. The apparatus of claim 1 where the execution module is configured to adjust the scale mode as a scaling transition.

24. A method comprising:
   detecting a size and a position of video on at least one channel of at least one video input source;
   automatically detecting at least one vertical blanking interval line in the video and detecting an aspect ratio and distinguishing 4×3 video from 16×9 video;
   automatically adjusting a scale mode responsive to the detecting, where the scale mode includes anamorphic and non-linear modes, the anamorphic scale mode being automatically applied to the 16×9 video, and the non-linear scale mode being automatically applied to the 4×3 video; and
   cropping the at least one vertical blanking interval line from the video.

* * * * *